Figure 1:
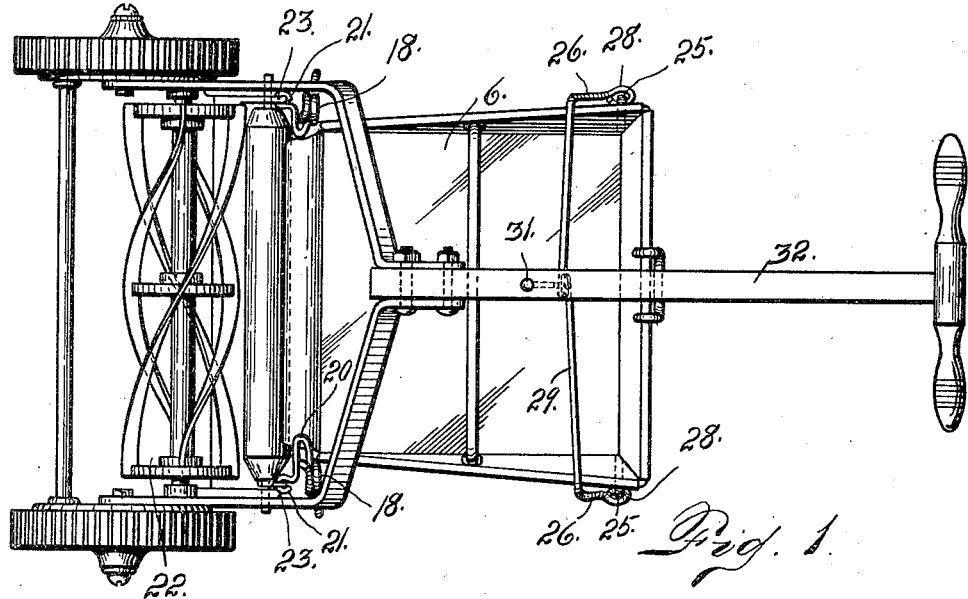

L. B. & N. GOLDBERG.
GRASS CATCHER FOR LAWN MOWERS.
APPLICATION FILED AUG. 6, 1914.

1,182,365.

Patented May 9, 1916.
2 SHEETS—SHEET 1.

L. B. & N. GOLDBERG.
GRASS CATCHER FOR LAWN MOWERS.
APPLICATION FILED AUG. 6, 1914.
1,182,365.
Patented May 9, 1916.
2 SHEETS—SHEET 2.
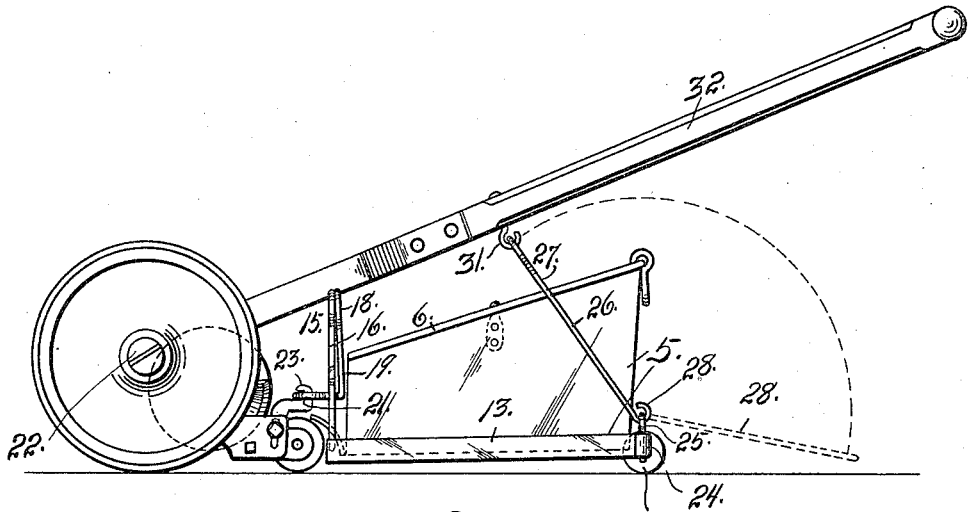
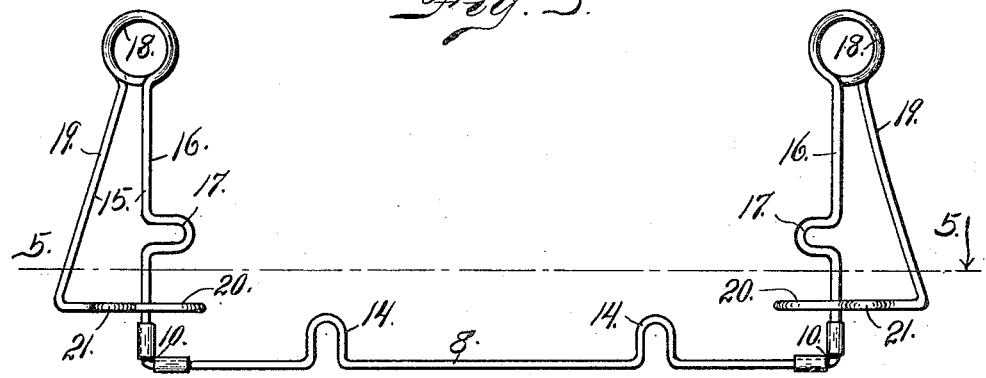
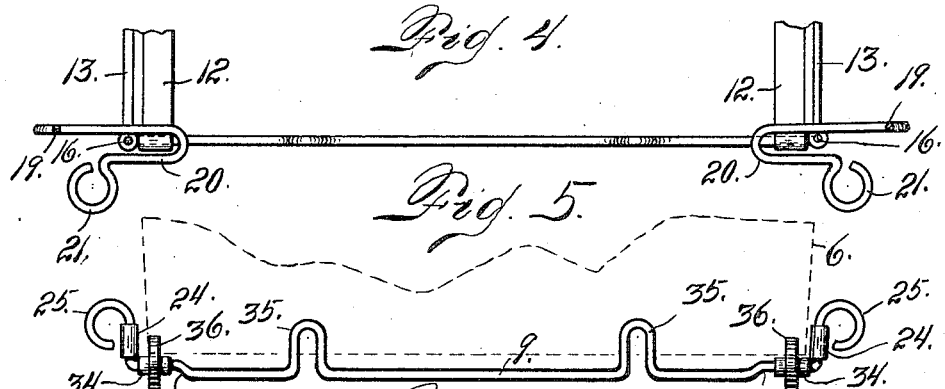

UNITED STATES PATENT OFFICE.

LOUIS B. GOLDBERG AND NATHAN GOLDBERG, OF DENVER, COLORADO.

GRASS-CATCHER FOR LAWN-MOWERS.

1,182,365.  Specification of Letters Patent.  Patented May 9, 1916.

Application filed August 6, 1914. Serial No. 855,385.

*To all whom it may concern:*

Be it known that we, LOUIS B. GOLDBERG and NATHAN GOLDBERG, citizens of the United States, residing in the city and county of Denver and State of Colorado, have invented certain new and useful Improvements in Grass-Catchers for Lawn-Mowers; and we do declare the following to be a full, clear, and exact description of the invention, such as will enable others skilled in the art to which it appertains to make and use the same, reference being had to the accompanying drawings, and to the characters of reference marked thereon, which form a part of this specification.

Our invention relates to improvements in grass catchers for lawn mowers, our object being to provide a supporting frame for the grass receptacle, which receptacle is readily detachable for the purpose of removing its contents. This frame work possesses a number of novel features to which the claims are directed. This frame includes forwardly and rearwardly located transversely arranged rods which are connected by angle bars which form guides for the grass catching receptacle, the said rods having projections which form stops to prevent the forward or rearward movement of the receptacle. By lifting the receptacle a short distance, it is readily removed toward the rear, as it will then pass over the projections of the rear rod. Pivotally connected with the rear extremities of the angle bars on opposite sides, is a U-shaped member adapted to extend above the receptacle and arranged to be connected with the handle of the mower forward of the rear extremity of the receptacle, thus making it practicable to get the desired handle leverage for operating purposes. In other words, by reason of the fact that the U-shaped member is pivotally connected with the body of the frame, it may be swung forwardly a sufficient distance to permit its connection with the handle of the mower far enough from the rear extremity of the latter to give a relatively long leverage for lifting purposes. This is an important feature in a device of this character, since during the operation of the machine, the grass catcher should be raised above the ground and when the receptacle contains a considerable quantity of grass, it is correspondingly heavy. Another feature of novelty consists in the upright spring clips, which, as illustrated in the drawing, are formed integral with the forward transverse rod. Each of these clips has a loop through which the upright member of the clip passes, forming a support to prevent the clip from bending forwardly during the operation of the machine, which is connected with the grass catcher through the medium of these clips.

Having briefly outlined our improved construction, we will proceed to describe the same in detail, reference being made to the accompanying drawing in which is illustrated an embodiment thereof.

Figure 2:
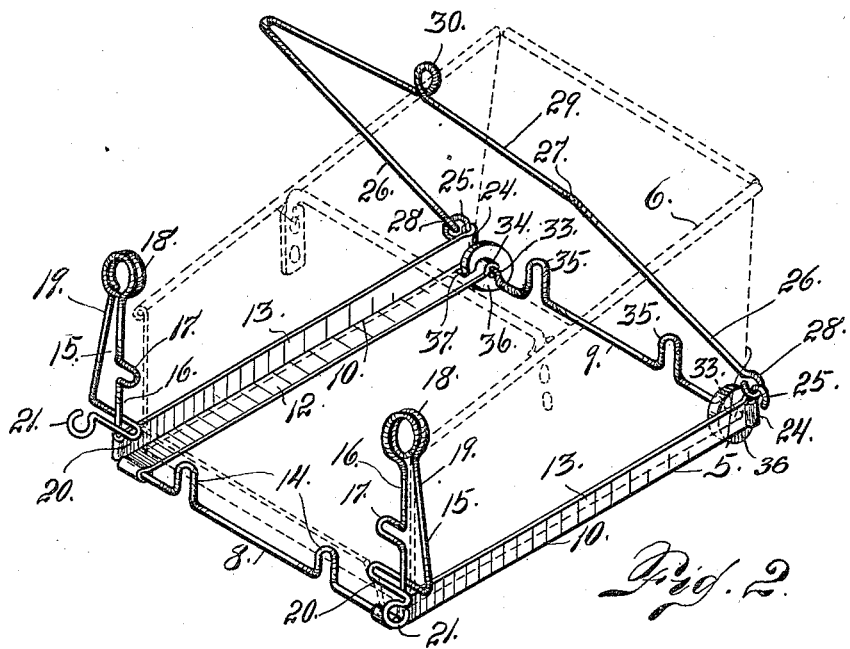

In this drawing, Figure 1 is a top plan view of a lawn mower, showing our improved grass catcher connected therewith in operative relation. Fig. 2 is a perspective view of the improved frame, the grass receptacle being retained by dotted lines. Fig. 3 is a side elevation of a lawn mower, with our improved grass catcher applied. Fig. 4 is a front view of the frame shown in detail and on a larger scale. Fig. 5 is a section taken on the line 5—5, Fig. 4, looking downwardly. Fig. 6 is a rear view of the frame, or an elevation illustrating the rear extremity of the lower part of the frame, the U-shaped member being removed. This view is on the same scale as Figs. 4 and 5.

The same reference characters indicate the same parts in all the views.

Let the numeral 5 designate the grass catcher considered in its entirety and comprising a grass receptacle 6, and a supporting frame. The grass receptacle is of ordinary or any suitable construction. The supporting frame is provided with front and rear transversely arranged rods 8 and 9, which are connected by angle bars 10 which extend in the direction of the travel of the machine, and are of sufficient length to suitably space the rods 8 and 9 and are themselves suitably spaced to form a support for the receptacle 6. The bottom of this receptacle rests upon the horizontal flanges 12 of the angle bars, while the vertical flanges 13 of these bars extend upwardly on opposite sides of the receptacle. The rods 8 and 9 are provided with upwardly extending projections 14 and 35, which extend above the bottom of the receptacle sufficiently to prevent the accidental movement of the receptacle either forward or rearward from its normal position for grass catching purposes. The projections as illustrated in the drawing are simply upwardly extending bends formed in the two rods. The outer extremities of the rod 8 are respectively connected with the forward ends of the angle bars 10. The rod 8 is bent upwardly at its outer extremities to form spring clips 15, composed of an upwardly extending part 16 having a stiffening loop or bend 17, its upper extremity merging into a spiral spring 18 whose axis is substantially parallel with the angle bars 10. Extending downwardly from the spring 18 is a part 19 which, at its lower extremity, is bent to form a loop 20 through which the member 16 passes, the free end of the rod extending forwardly from this loop, and being formed into an eye 21. The two spring clips 15 are both of the same construction, and their eyes 21 form a means for connecting the grass catcher with the lawn mower 22. The manner of forming this connection is shown at 23 in Figs. 1 and 3. It will thus be seen that the grass catcher is carried along with the mower by a forward pull upon the eyes 21 of the clips. By reason of the formation of the loops 20 through which the upright member 16 of each clip passes, the clip is greatly strengthened and the pull upon the eyes does not cause the eye portions of the clip to pull away from the other portion, as would be the case in the absence of the arrangement of the loops 20 and the parts 16 of the clips. The outer extremities of the rod 9 are bent upwardly where they are attached to the rear ends of the angle bars 10, as shown at 24. These upward projections terminate in hooks 25, with which the side arms 26 of a U-shaped member 27 are connected by means of eyes 28 formed on the lower extremities of the arms 26. This U-shaped frame is provided with a transversely arranged part 29, which connects the side parts 26 at the top, and is provided with a central eye 30 adapted to be connected with a hook 31 carried by the handle 32 of the lawn mower, the said hook being located considerably forward of the rear extremity of the receptacle 6, in order to give the desired handle leverage for easily operating the machine, as heretofore outlined.

The side arms 26 of the U-shaped member 27 extend forwardly on opposite sides of the receptacle 6, while the transverse part 29 extends above this receptacle. This U-shaped part is freely movable, whereby it may be readily connected with and disconnected from the hook 31 of the handle. The receptacle 6 is readily movable back and forth between the arms 26 of the U-shaped member for the purpose of removing and replacing the receptacle. In order to remove the receptacle 6, it is only necessary to lift the same sufficiently to allow it to clear the projections 35, when it may be drawn rearwardly out of the frame whenever desired, as for the purpose of emptying the grass. It may be quickly and easily replaced upon the frame 7 by a movement the reverse of that used during the removal.

The opposite extremities of the rod 9 are bent upwardly or vertically offset as shown at 33, whereby the rear extremities 34 of the horizontal angle bar members 12 are raised somewhat above the surface of the ground when the rear extremity of the grass catcher rests upon the ground. By reason of this construction, the extremities 34 of the horizontal flanges 12 are prevented from coming in contact with the ground during the movement of the machine or when it is at rest, and it is therefore impossible for these extremities to wear out by reason of contact with the ground. In order to more fully accomplish this object we have applied rollers or small wheels 36 to the offset extremities of the rod 9, the rear ends of the horizontal flanges 12 of the angle bars being slotted as shown at 37 to receive these wheels or rollers, which may be of sufficient diameter to prevent the entire rod 9 from touching the ground or other surface over which the machine is traveling.

It has been found important in a construction of this character to prevent wear upon the lower flanges of the angle bars since but little wear is required in order to disconnect these extremities from the rods.

Our invention, it is believed, will be readily understood from the foregoing description, and hence its operation need not be further explained in detail.

Having thus described our invention, what we claim is,—

1. A grass catcher for lawn mowers including a receptacle, a supporting frame having front and rear transversely arranged rods, angle bars whose forward and rearward extremities are connected with said rods, the rods having upwardly projecting stiffening loops which serve as stops to prevent accidental back and forth movement of the receptacle.

2. A grass catcher for lawn mowers, including a frame having upwardly projecting clips located at the forward extremity thereof composed of two parts connected at the top by a spring, the lower portion of one part having a horizontal laterally disposed loop through which the other part passes, the looped member of each clip being constructed to connect with the lawn mower.

3. A grass catcher for lawn mowers including a frame for supporting the receptacle, the said frame having upright clips arranged on opposite sides of its forward extremity, each clip being composed of a vertical member and a member forming an angle therewith, the lower extremity of the last named member terminating in a horizontal, laterally disposed loop through which the vertical member passes, each loop having a forwardly projecting eye adapted to connect with the lawn mower, substantially as described.

4. A grass catcher for lawn mowers, comprising a receptacle and a frame distinct from the receptacle for supporting the latter, said frame comprising a body portion and arms pivotally connected with the rear of said body portion and projecting forwardly adjacent the sides of the grass receptacle when in place, said arms being connected at the top by a transverse part which extends above the grass receptacle and is adapted to be connected with the handle of the lawn mower forward of the rear extremity of the grass receptacle, for the purpose set forth.

5. A grass catcher for lawn mowers comprising a grass receptacle and a supporting frame therefor, the said frame including front and rear transversely arranged rods, and angle bars longitudinally disposed and transversely spaced, their front and rear extremities being connected with the opposite extremities of the rods, the rear rod having its extremities vertically offset, whereby the parts of the angle bars connected therewith are raised above the ground and prevent it from wear, substantially as described.

6. A grass catcher for lawn mowers comprising a grass receptacle and a supporting frame therefor, the said frame including front and rear transversely arranged rods, and bars longitudinally disposed and transversely spaced, their front and rear extremities being connected with the opposite extremities of the rods, and small wheels or rollers mounted on the rods whereby the latter are supported from the ground or other surface.

7. A grass catcher for lawn mowers including a receptacle, a supporting frame having front and rear transversely arranged rods, supporting means whose forward and rear extremities are connected with said rods, the rods having upwardly projecting loops which serve as stops to prevent accidental back and forth movement of the receptacle.

8. A grass catcher for lawn mowers, including a frame having upwardly projecting clips located at its forward extremity, composed of two parts connected at the top, the lower portion of one part having a horizontal laterally disposed loop through which the other part passes, and the said first named part provided with means for connecting the same with the lawn mower.

9. A grass catcher for lawn mowers including a frame having upwardly projecting clips located at its forward extremity, composed of two parts connected at the top by a spring, one part having a stiffening loop therein and the lower portion of the other part having a horizontal laterally disposed loop through which the first named part passes, the looped member of the second named part of each clip being constructed to connect with the lawn mower.

10. A grass catcher for lawn mowers including a receptacle, a supporting frame having front and rear transversely arranged rods, angle bars whose forward and rear extremities are connected with the said rods, and the rods having means projecting upwardly therefrom which serve as stops to prevent accidental back and forth movement of the receptacle.

11. A grass catcher for lawn mowers comprising a receptacle and a frame distinct from the receptacle for supporting the latter, said frame comprising a body portion and a member pivotally connected with the rear of the body portion and having upwardly projecting arms spaced to receive the receptacle, the upper part of the said member being adapted to be connected with the handle of the lawn mower forward of the rear extremity of the receptacle.

12. In a grass catcher for lawn mowers, the combination with a receptacle, of a frame distinct from the receptacle for supporting the latter and comprising a body member and a U-shaped part pivotally connected with the body member at the rear extremity of the latter and adapted to swing forwardly therefrom.

13. In a grass catcher for lawn mowers, the combination with a receptacle, of a relatively low frame distinct from the receptacle for supporting the latter, the receptacle extending above the said frame, the latter comprising a body member and a U-shaped part pivotally connected with the body member at the rear extremity of the same, and adapted to swing forwardly therefrom.

In testimony whereof we affix our signatures in presence of two witnesses.

LOUIS B. GOLDBERG.
NATHAN GOLDBERG.

Witnesses:
MAZE KIRBY,
A. EBERT O'BRIEN.